US006446082B1

(12) United States Patent
Arita

(10) Patent No.: US 6,446,082 B1
(45) Date of Patent: Sep. 3, 2002

(54) METHOD OF RECEIVING TIME-SPECIFIED PROGRAM CONTENTS

(75) Inventor: Kenji Arita, Tokyo (JP)

(73) Assignee: Impress Corporation, Tokyo (JP)

( * ) Notice: Subject to any disclaimer, the term of this patent is extended or adjusted under 35 U.S.C. 154(b) by 0 days.

(21) Appl. No.: 09/397,939

(22) Filed: Sep. 17, 1999

(30) Foreign Application Priority Data

Sep. 21, 1998 (JP) .......................................... 10-267094

(51) Int. Cl.[7] .............................................. G06F 17/30
(52) U.S. Cl. ........................... 707/104.1; 707/5; 707/10; 707/101; 725/42; 725/50; 709/203; 709/218; 713/150
(58) Field of Search ....................... 707/10, 101, 104.1, 707/5, 102; 370/464; 455/15, 512; 709/218, 219, 203; 713/150; 725/13, 42, 50

(56) References Cited

U.S. PATENT DOCUMENTS

| 5,278,836 A | * | 1/1994 | Iimura et al. ................ 370/464 |
| 5,353,121 A | * | 10/1994 | Young et al. .................... 725/52 |
| 5,479,266 A | * | 12/1995 | Young et al. ................ 348/734 |
| 5,479,268 A | * | 12/1995 | Young et al. ................ 348/734 |
| 5,559,548 A | * | 9/1996 | Davis et al. ................. 348/906 |
| 5,559,549 A | * | 9/1996 | Hendricks et al. ........... 725/138 |
| 5,585,838 A | * | 12/1996 | Lawler et al. ............... 345/716 |
| 5,585,866 A | * | 12/1996 | Miller et al. ................ 348/570 |
| 5,623,613 A | * | 4/1997 | Rowe et al. ................. 345/784 |
| 5,686,954 A | * | 11/1997 | Yoshinobu et al. ........... 725/13 |
| 5,721,903 A | * | 2/1998 | Anand et al. .................... 707/5 |
| 5,801,787 A | * | 9/1998 | Schein et al. ............... 348/589 |
| 5,815,799 A | * | 9/1998 | Barnes et al. ................. 455/15 |
| 5,832,496 A | * | 11/1998 | Anand et al. ................ 707/102 |
| 5,850,218 A | * | 12/1998 | LaJoie et al. ................ 348/906 |
| 5,857,190 A | * | 1/1999 | Brown ......................... 707/10 |
| 5,870,746 A | * | 2/1999 | Knutson et al. .............. 707/101 |
| 5,884,035 A | * | 3/1999 | Butman et al. .............. 709/218 |
| 5,940,073 A | * | 8/1999 | Klosterman et al. ........ 345/721 |
| 6,026,430 A | * | 2/2000 | Butman et al. .............. 709/203 |
| 6,091,823 A | * | 7/2000 | Hosomi et al. .............. 380/211 |
| 6,111,614 A | * | 8/2000 | Mugura et al. .............. 345/592 |
| 6,175,920 B1 | * | 1/2001 | Schanze ....................... 713/150 |

FOREIGN PATENT DOCUMENTS

| JP | 6-4933 | 1/1994 |
| JP | 6-118185 | 4/1994 |

OTHER PUBLICATIONS

Liu, Tien–Yow et al., "Link Activation Protocols for a Mobile Communication Network with Directive/Adaptive Antennas", IEEE Transactions on Communications, Jan. 2000, vol. 48, Issue: 1, pp. 60–74.*
Penafiel, M. et al., "An Assessment of Potential Bioeffects from Exposure to Cellilar Phone RF Signals Using TDMA, in Particular GSM–Type RF Signals", 1998 International Conf. on Microwave and Millimeter Wave Technology, Aug. 18–20, 1998, pp. 799–802.*
Active Channels Guide Overview, "You're not Running Internet Explorer," 1997 Microsoft Corp. http://www.microsoft.com.
RealNetworks.com—The Home of Streaming Media.

* cited by examiner

Primary Examiner—Jean M. Corrielus
Assistant Examiner—Shahid Alam
(74) Attorney, Agent, or Firm—Burr & Brown

(57) ABSTRACT

The program information in which the distributive transmission scheduled date and time, and the address of a distributive transmission server are registered is presented by a program management server. On the client side which has received the distributive transmission of the program information, the date and time when acquiring the program information are registered and the program management server is accessed. Then, if it is judged that the program information of the program management server is already updated on or after the date and time when acquiring the program information, then the program information on the client side is also updated on the basis of the updated contents. As a result, even if the distributive transmission date and time of the program are changed, the terminal side can follow this change.

10 Claims, 14 Drawing Sheets

FIG. 2

MONTHLY PROGRAM - NETSCAPE

FILE(F) EDITION(E) VIEW(V) JUMP(G) COMMUNICATOR(C) HELP(H)

PROGRAM SCHEDULE TABLE IN AUGUST
ON-DEMAND PROGRAM BEFORE PRESENT DAY CAN BE VIEWED BY CLICKING PROGRAM NAME
UPDATED DATE 8.01, 1998

| SUN | MON | TUE | WED | THU | FRI | SAT |
|---|---|---|---|---|---|---|
| | | | | | | 81 |
| 2 | 3 | 4 | 5 | 6 | 7 | 8 |
| | | PURPLE BOILED RICE DEGOGO! | BIG FISH TV 1998 J LEAGUE INTERNET OUTSIDE BROADCAST | PC WATCH RADIO | MUSIC WATCH RADIO | |
| 9 | 10 | 11 | 12 | 13 | 14 | 15 |
| | | | BIG FISH TV | PC WATCH RADIO | MUSIC WATCH RADIO | |
| 16 | 17 | 18 | 19 | 20 | 21 | 22 |
| | PURPLE BOILED RICE DEGOGO! HIGH-TECHNOLOGY MUSICAL COMPOSITION ROOM OF RUMIKO TANAKA | BIG FISH TV DEGOGO! | | PC WATCH RADIO | MUSIC WATCH RADIO | |
| 23 | 24 | 25 | 26 | 27 | 28 | 29 |
| | PURPLE BOILED RICE DEGOGO! | | BIG FISH TV | PC WATCH RADIO | MUSIC WATCH RADIO | |
| 30 | 31 | | | | MUSIC WATCH RADIO | |

YELLOW = LIVE PROGRAM, WHITE = ON-DEMAND

COMPLETION OF DOCUMENT

FIG. 6

MONTHLY PROGRAM – NETSCAPE

FILE(F) EDITION(E) VIEW(V) JUMP(G) COMMUNICATOR(C) HELP(H)

RETURN | NEXT | RELOAD | HOME | SEARCH | GUIDE | PRINT | SECURITY

BOOK MARK | JUMP | c:/WINDOWS/temp/my980812.html

MY PROGRAM GUIDE
PROGRAM SCHEDULE TABLE IN AUGUST
ON-DEMAND PROGRAM BEFORE PRESENT DAY CAN BE VIEWED BY CLICKING PROGRAM NAME
UPDATED DATE 8.12, 1998

| SUN | MON | TUE | WED | THU | FRI | SAT |
|-----|-----|-----|-----|-----|-----|-----|
|     |     |     |     |     |     | 1 |
| 2 | 3 | 4 | 5 | 6 | 7 | 8 |
| 9 | 10 | 11 | 12<br>1998 J LEAGUE<br>INTERNET<br>OUTSIDE<br>BROADCAST | 13 | 14 | 15 |
| 16 | 17 | 18 | 19 | 20 | 21 | 22 |
| 23 | 24 | 25 | 26 | 27 | 28 | 29 |
| 30 | 31 |     |     |     |     |     |

YELLOW = LIVE PROGRAM, WHITE = ON-DEMAND

PRINT THIS PAGE

FIG. 13

| USER ADDRESS | CATEGORY | PRESENTED ADVERTISEMENT CONTENTS |
|---|---|---|
| abcd@impress.co.jp | MUSIC | http://www.xyz.html<br>http://www.abc/xy |
| | SPORTS | http://abz/xyL/ |
| zzz@abc.ne.jp | EDUCATION | xyz.exe |
| ------- | ------- | ------- |

1301

METHOD OF RECEIVING TIME-SPECIFIED PROGRAM CONTENTS

BACKGROUND OF THE INVENTION

1. Field of the Invention

The present invention relates, in the information presenting service which is presented under the network environment such as the Internet and which is distributively transmitted on the basis of the time specification, to the technology by which a client can readily grasp the information distributive transmission time.

2. Description of the Related Art

The distributive transmission of the multimedia data of the large volume has become possible as the preparation of the communication base has been advanced on the Internet as the data communication system based on the TCP/IP. Along with this, the system with which the contents (the program contents) are presented on the date and time which are previously set as in the television broadcasting is in the process of being constructed.

Now, when a user hopes to browse the contents for which the distributive transmission time is set as described above, the reproducing program for which the reproduction of the moving pictures is possible on the browsing program called a browser is previously waited as in the form of the plug-in. Then, at the time when it becomes the time to carry out the distributive transmission, a user specifies the address called a URL on the Internet on the basis of the above-mentioned browser. At the time when the distributive transmission of the contents are started from a server which has been specified on the basis of the address of interest, on the browser on the user side, the above-mentioned reproducing program is activated in correspondence to the data format of the contents so that the viewing of the moving pictures becomes possible on the browser.

However, when receiving the contents for which the distributive transmission time is specified, if the starting time of the distributive transmission of the contents is delayed due to some causes or other on the server side, a user needs to wait for the distributive transmission of the contents with the browser of a terminal unit being activated. For example, the change of the starting time of the outside broadcast for a sport due to the changes in the weather state or the like corresponds to this.

In addition, while there is a method wherein the change of the distributive transmission time is reported to each of users by utilizing the reporting means such as an e-mail at a time point when the change of the distributive transmission time is previously determined, since the reservation of the reception of the contents is carried out in the program on the terminal on the user side in one-sided manner, it is difficult to manage the mail addresses of all of the users on the server side.

Moreover, since the user side has no means for grasping visually for which contents a user makes a reservation for the distributive transmission, a user needs to previously write down the viewing date and time of the contents which have been reserved by himself/herself.

In the light of the foregoing, the present invention was made in order to solve the above-mentioned problems associated with the prior art, and it is therefore a first technical object of the present invention to provide the technology by which when there is the change in the distributive transmission contents which have been reserved and registered on a terminal by a user, the reserved contents of interest are automatically updated to the contents after the change, and the reserved contents can be readily grasped by a user.

On the other hand, in the SMIL (Synchronized Multimedia Integrated Language) 1.0 of the W3C (World Wide Web Consortium) as the standard of the multimedia information on the network, the definition of the synchronous information such as which portion of the picture at what time the multimedia presentation having the voice information, the moving picture information, the text information and the image information combined with one another is displayed is defined.

However, the point that the multimedia information utilizing those SMILs is displayed effectively for a user with a reduced laborious burden on an SMIL manufacturer is not taken into consideration in the prior art so much.

Then, it is a second technical object of the present invention to reduce the burden exerted on a producer side in the broadcasting transmission in the network to carry out the effective information display for users.

SUMMARY OF THE INVENTION

According to the present invention, when accessing to the distributive transmission server to acquire the program information, the information relating to the acquisition date and time is recorded, and then when comparing the distributive transmission date and time, two by two, every acquisition date and time with each other to detect that the distributive transmission time of the program contents has been changed, the information relating to the distributive transmission date and time is rewritten on the basis of the changed contents.

In addition, the advertisement contents are received from the advertisement presentation server either before the reception of the program contents or synchronously with the reception thereof to reproduce the advertisement contents.

Now, by the network is meant, for example, the Internet network, and by the program distributive transmission is meant, for example, the distributive transmission of the program which is reproduced by the Real Player or the like manufactured by Real Networks Inc.

When the distributive transmission date and time are changed along with the change of the game schedule of the outside broadcast of the sport, if the contents of the program management server are updated, then whether or not the program information on the program audio-visual terminal side needs to be updated can be simply judged by referring to its acquisition date and time so that the automatic update of the program information becomes possible without waiting for the setting change from a user.

Such a technology can be concretely presented in the form of an add-in program or a helper application to a browser program on the program audio-visual terminal, and the recording media include all of the program storing media such as a CD-ROM, and a floppy disc.

BRIEF DESCRIPTION OF THE DRAWINGS

The above and other objects as well as advantages of the invention will become clear by the following description of the preferred embodiments of the present invention with reference to the accompanying drawings, wherein:

FIG. 2 is a diagram of an example of a program table which is produced by a program management server;

FIG. 6 is a diagram showing an example of a local program table;

FIG. 13 is a diagram useful in explaining a contents table in a third embodiment according to the present invention.

DESCRIPTION OF THE PREFERRED EMBODIMENTS

The preferred embodiments of the present invention will hereinafter be described in detail with reference to the accompanying drawings.

First Embodiment

Figure 1:
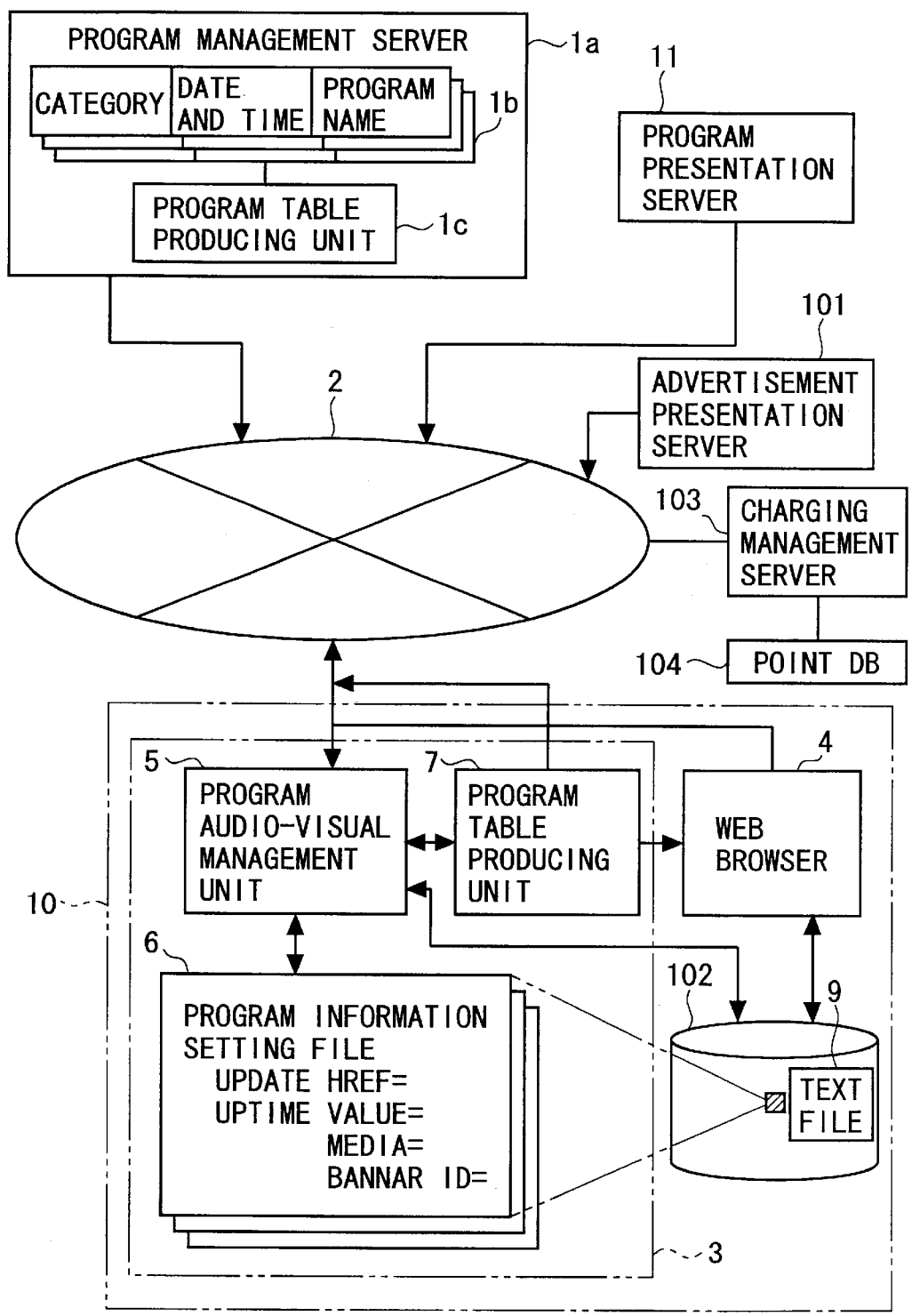
FIG. 1 is a block diagram showing a configuration of a system of a first embodiment according to the present invention.

FIG. 1 is a block diagram showing a configuration of a system of a first embodiment according to the present invention. In the figure, reference numeral 1a designates a program management server which has program information 1b and a program table producing unit 1c.

The program information 1b is of a form in which the category of the program contents, the presentation date and time and the program name (the program ID) are registered, and the program table producing unit 1c has the function of producing a broadcasting scheduled program table in an HTML (Hyper Text Mark-up Language) format as shown in FIG. 2 on the basis of the program information 1b.

A program presentation server 11 is the server for presenting the contents as the actual program data, and the program management server 1a has the function of distributively transmitting the program data on a network 2 at the time which is defined on the basis of the program information 1b of the program management server 1a.

Figure 10:
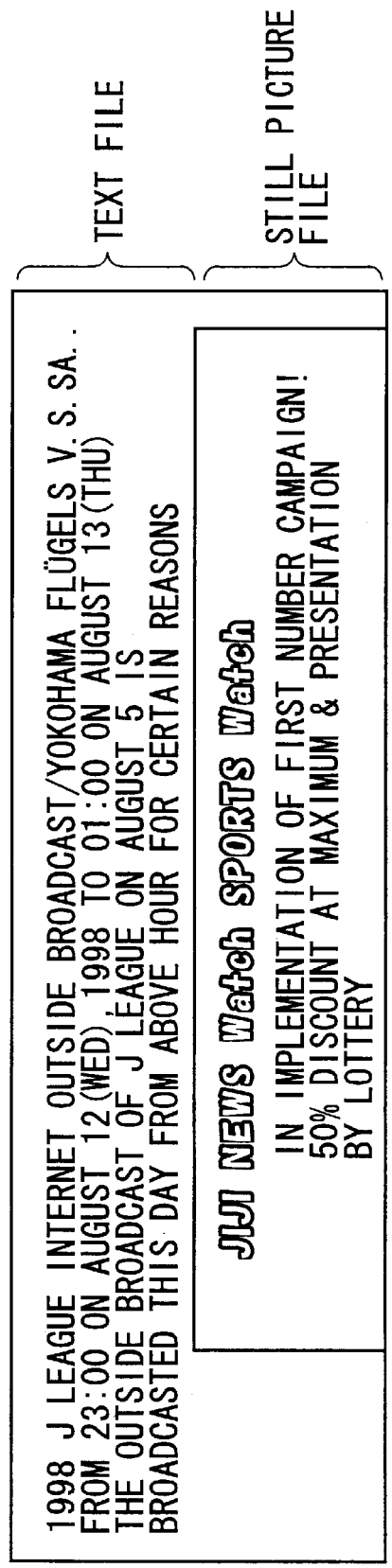
FIG. 10 is a diagram showing an example (1) displayed on a program audio-visual terminal in the second embodiment.

An advertisement presentation server 101 is the server for distributively transmitting the advertisement contents and is designed in such a way as to be able to distributively transmit the advertisement contents containing the still pictures or the moving pictures as shown in FIG. 10 to a program audio-visual terminal 10.

An charging management server 103 is operated in conjunction with an charging system (not shown) and is designed in such a way that when reserving the program at a program audio-visual terminal 10 as will be described later or when viewing the program contents, the charging processing can be directly carried out from a credit card account, a bank account or the like of the user of interest. In this connection, this charging management server 103 is provided with a point database 104 so that the number of points which are set every program or viewing time is accumulated for the user of interest, and hence the presentation of the discount for the charging amount or other special favors becomes possible.

The program audio-visual terminal 10 is connected to the above-mentioned program management server 1a and the like through the network 2. For this connection protocol, the TCP/IP, i.e., the Internet is adopted. In this connection, the connection form may be either the continuous connection form or the temporary dial up connection form.

The program audio-visual terminal 10 is constructed by either a personal computer or a computer system including the communication means (not shown) such as the Web TV and a browsing means (a browser 4).

On the operating system on the program audio-visual terminal 10, this browser 4 (Web Browser) and a program audio-visual management program 3 (Stream Remainder) are both operated. Now, the browser 4 corresponds, for example, to the Internet explorer or the like which is operated as the browsing application on the Windows manufactured by Microsoft Co. Ltd. The plug-in application for reproducing the moving pictures, such as the real player manufactured by Real Networks Inc. is previously installed in this browser 4 and hence the moving images (the program contents) which are accumulated in the server of interest (in this case, the program presentation server 11) can be browsed by specifying the specific server address (in this case, the program presentation server 11).

The program audio-visual management program 3 includes: a program audio-visual management unit 5; a program information setting file 6 for storing therein the program contents the viewing of which is reserved by a user; and a program table processing unit 7 for producing the program table in the format of the HTML. The program information setting file 6 is concretely designed in such a way as to be stored in a storage unit 102 of the program audio-visual terminal 10.

In the above-mentioned configuration, when a user carries out the viewing reservation of the program, first of all, the browser 4 is activated to access to the program management server 1a. As a result, the program table which is produced by the program table producing unit 1c of the program management server 1a is displayed in the form as shown in FIG. 2 on the browser 4.

Under this condition, a user specifies the Internet outside broadcast of the J League which is set at 23:00 on August 5 for example on the browser 4 using the coordinate specifying device such as a mouse, thereby acquiring the program information relating to the program of interest by the program management server 1a.

In this program information, the URL of the program presentation server 11 and the acquisition date and time of the program information of interest are contained therein, and this information is registered in the form as described below in the program information setting file 6.

update href="http://chanclo.impress.co.jp/jleague.jpg"
uptime value="01/August/1998 19:12:22+09"

From the abode, it is understood that the acquisition date and time of this program information is 7:00 p.m. on Aug. 1, 1998.

In this connection, by the acquisition date and time of this program information is not meant the date and time when the distributive transmission of the program data is actually scheduled, but is meant the date and time when the information relating to the program data is acquired on the program audio-visual terminal of side on the user side.

Figure 3:
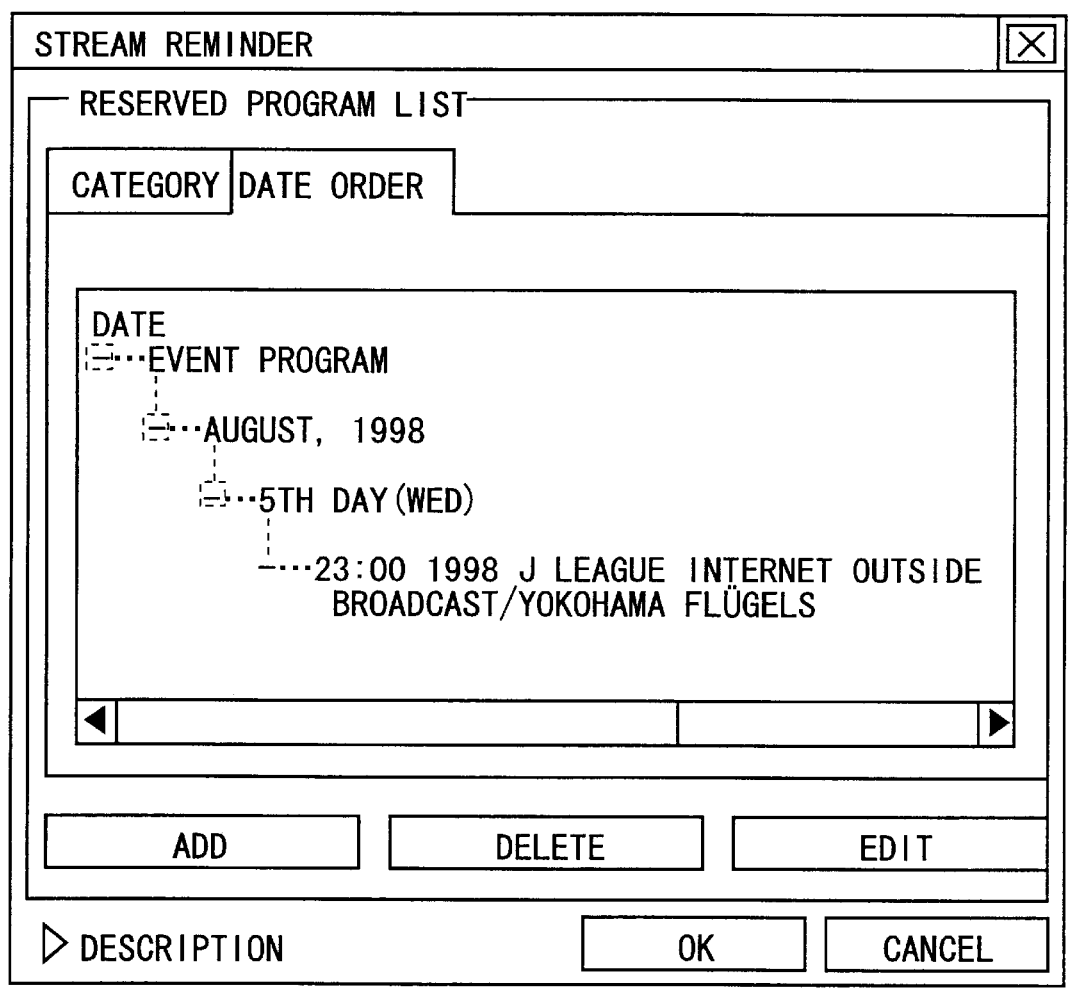
FIG. 3 is a diagram of an example of a program reservation and confirmation list which is displayed on a program audio-visual terminal.
Figure 4:
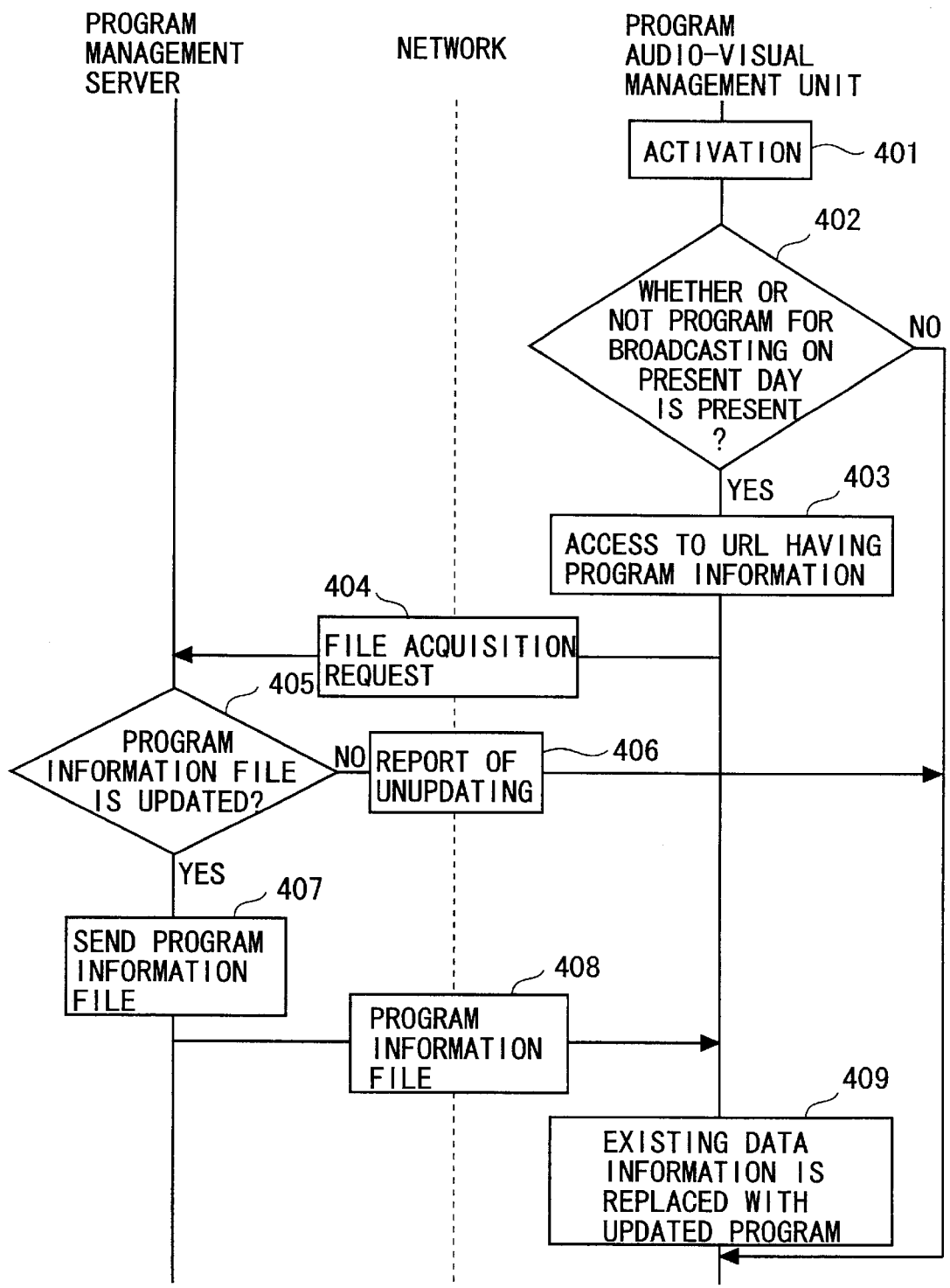
FIG. 4 is a sequence diagram showing the procedure of updating the program information.

In this connection, the confirmation of the reservation situation on the user side can be carried out on the basis of the program reservation and confirmation list, shown in FIG. 3, which is produced by the program audio-visual management unit 5. In the reservation and confirmation list of interest, the category of the reserved program "Event Program", the date and time "23:00 on (Wed) Aug. 5, 1998", and the program contents "1998 J League Internet Outside Broadcast . . . " are displayed.

Then, it is assumed that for this program information, the date and time of the distributive transmission thereof is changed due to some circumstances or other and as a result, the distributive transmission thereof is scheduled from 23:00 on (Wed) August 12. At this time, it is assumed that the change information of the distributive transmission schedule of the program of interest was firstly reflected on the program management server 1a, and in the program management server 1a, the update of the change information of the distributive transmission date and time was already carried out at a time point of 9:00 a.m. on August 5.

Next, at the time when the program audio-visual management program 3 on the program audio-visual terminal 10 is activated (Step 401), the program audio-visual management unit 5 checks whether or not the reserved program which will be broadcasted on that day is present (Step 102). Then, if it is checked in Step 402 that the program for which a user carries out the viewing reservation is present, then the program management server 1a in which the program information of interest is present is accessed (Step 403) to carry out the acquisition of the program information from the program management server 1a of interest (Step 404).

Now, the program audio-visual management unit 5 compares its program setting file 6 with the program information file on the program management server 1a side. If it is judged that the program information file on the program management server 1a is not yet updated, then the network receives the report indicating that the program information file is not yet updated (Step 406) to confirm that the program setting file 6 which is possessed by the unit 5 is the newest file.

On the other hand, if it is judged that the program information file on the program management server 1a side is already updated, the unit program audio-visual management 5 receives the updated program information file, and then rewrites its program setting file 6 (Steps 407, 408 and 409).

In this case, the date, August 5, of the program which a user reserved is changed to the date, August 12, and also the above-mentioned program information file becomes uptime value="05/August/1998 09:12:22+09" on the program management server 1a side. Therefore, since it is understood that this program information was updated at 9:00 a.m. on August 5, this date and time are newer than 7:00 p.m. on August 1 as the above-mentioned acquisition date and time. Thus, the program information of the program audio-visual management unit 5 is updated to the new program information. As a result, the distributive transmission date and time of the program information which is managed by the program audio-visual management unit 5 is also changed from 23:00 on August 5 to 23:00 on August 12.

Figure 5:
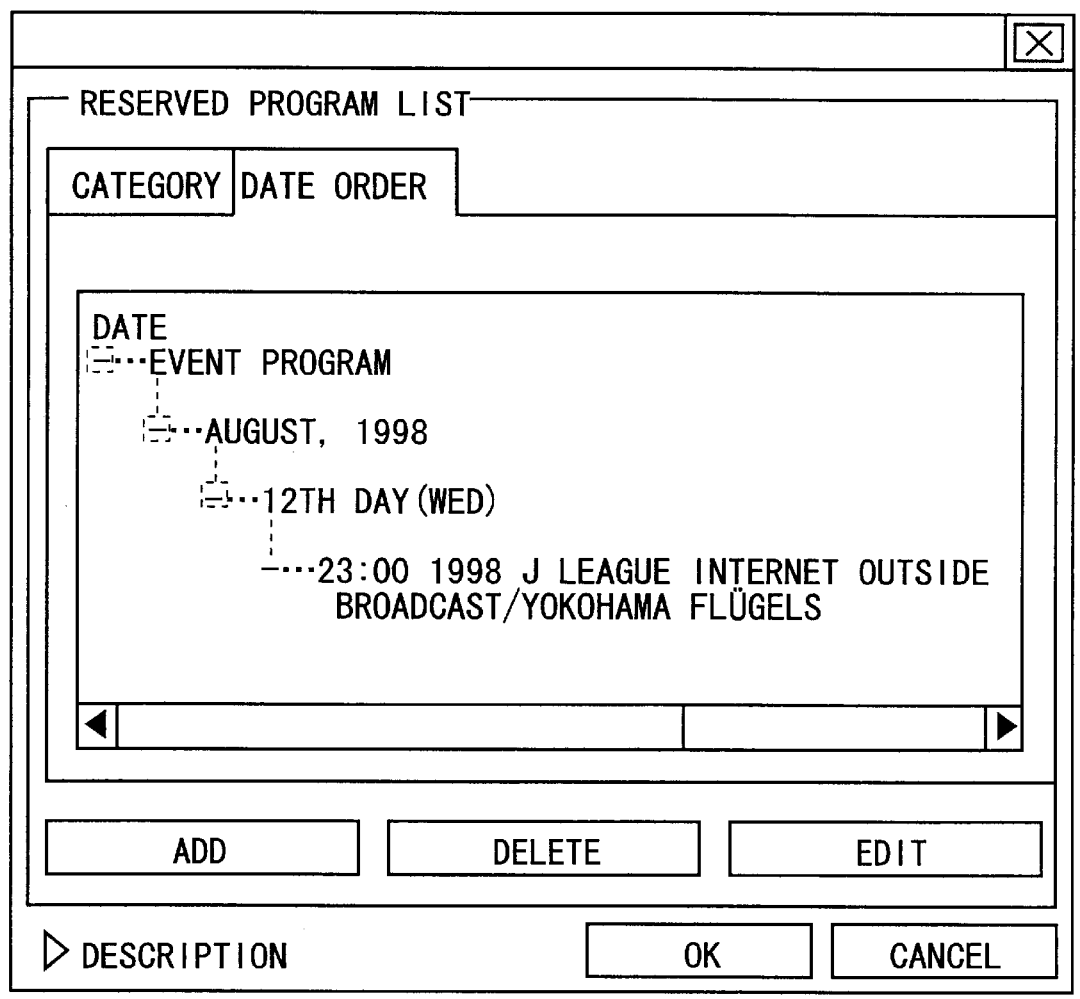
FIG. 5 is a diagram showing an example of a program reservation and confirmation list after completion of the update.

The change result can be confirmed on the basis of the program reservation and confirmation list as shown in FIG. 5.

In addition, such program information can be delivered from the program audio-visual management unit 5 to the program table producing unit 7 to be displayed in the form of the local program table as shown in FIG. 6 on the browser 4.

Figure 7:
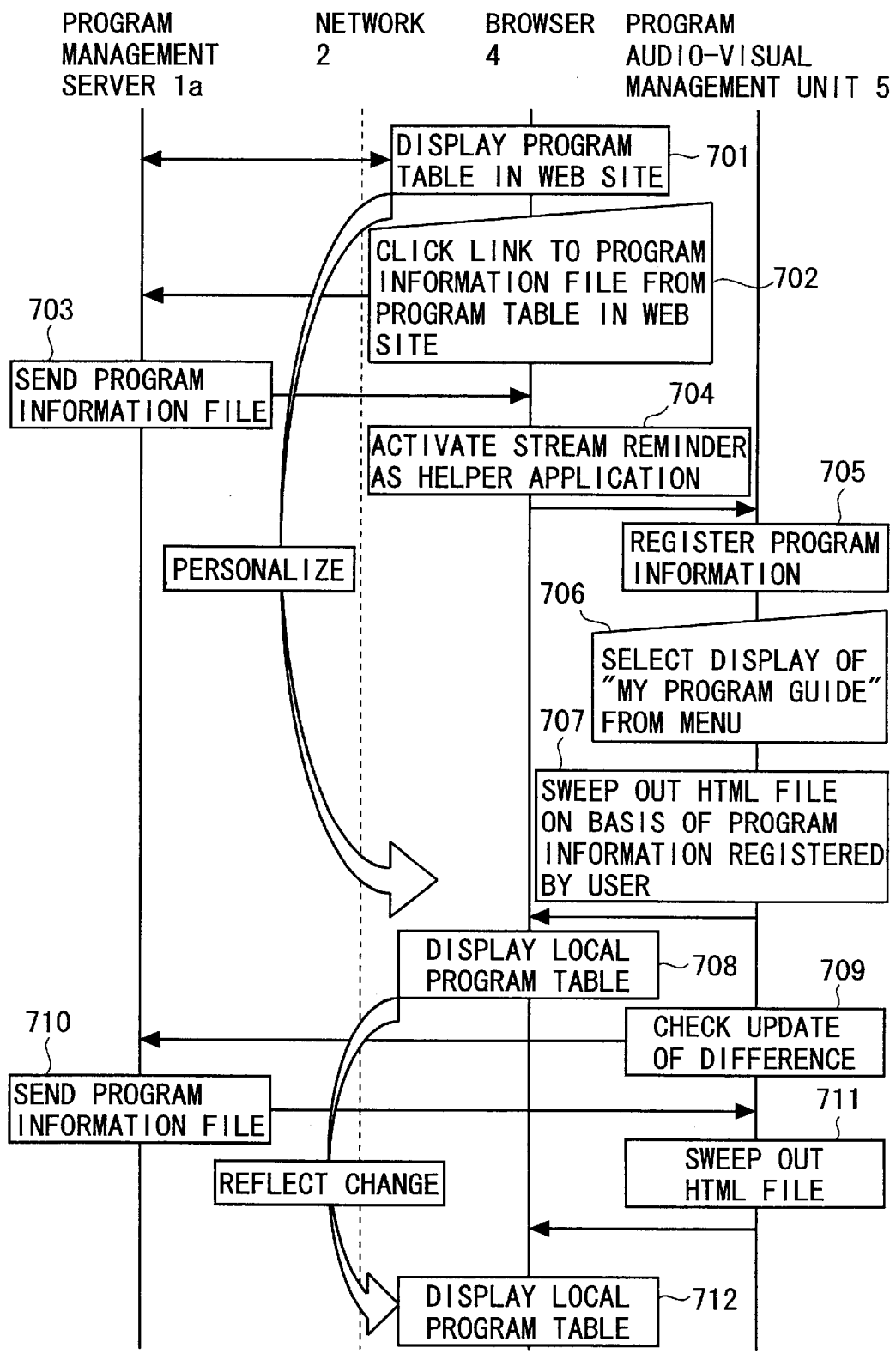
FIG. 7 is a sequence diagram showing the processing procedure with a program management server when a local program table is produced.

FIG. 7 shows the procedure of updating the program information using such a local program table.

First of all, the program table which is of the HTML format and which has been produced in the program table producing unit 1c of the program management server 1a is displayed on the browser 4 on the user side (Step 701), Then, the program which a user hopes to view from the program table displayed on the browser 4 is specified by a user using the coordinate specifying device such as a mouse (Step 702). At this time, the specified program information file is sent from the program management server 1a to the browser 4 (Step 703).

At the time when having received this program information file, the browser 4 activates the program audio-visual management program 3 (Step 704) and then registers the program information of interest in the program audio-visual management unit 5 (Step 705). At the same time, the program information setting file 6 is produced to start the management of the updated date and time of the program information.

Next, at the time when the browser 4 instructs to produce the program table (Step 706), the local program table is produced in the format of the HTML file on the basis of the program information which has been received by the program audio-visual management unit 5 in the program table producing unit 7 (Step 707) to be displayed on the browser 4 (Step 708).

The program audio-visual management unit 5 accesses periodically to the program management server 1a to check whether or not its reserved program information is updated (Step 709). More specifically, the check can be carried out on the basis of whether or not the contents of the program management server on and after the acquisition date and time of that program information are changed using the program setting file 6.

Now, if it is judged that the program information of the program management server 1a is updated, then the updated program information file of interest is received (Step 710), and then the program table producing unit 7 produces the new local program table on the basis of the updated program information file (Step 711). The updated program table is displayed on the browser 4 (Step 712).

Incidentally, at this time, on the basis of the program information file, the data of the date and time and the program name may be swept out in the format of the CSV file to the personal schedule management application (Step 711a). Specifically, in the case where the OutLook (the personal information management application manufactured by Microsoft Co. Ltd.) is installed on the OS of the personal computer of interest, the program information may be outputted in the form which can be imported to that application. As a result, a user can confirm the program audio-visual reservation, together with the program table in the format of the HTML, even on the personal schedule management application.

Second Embodiment

Figure 8:
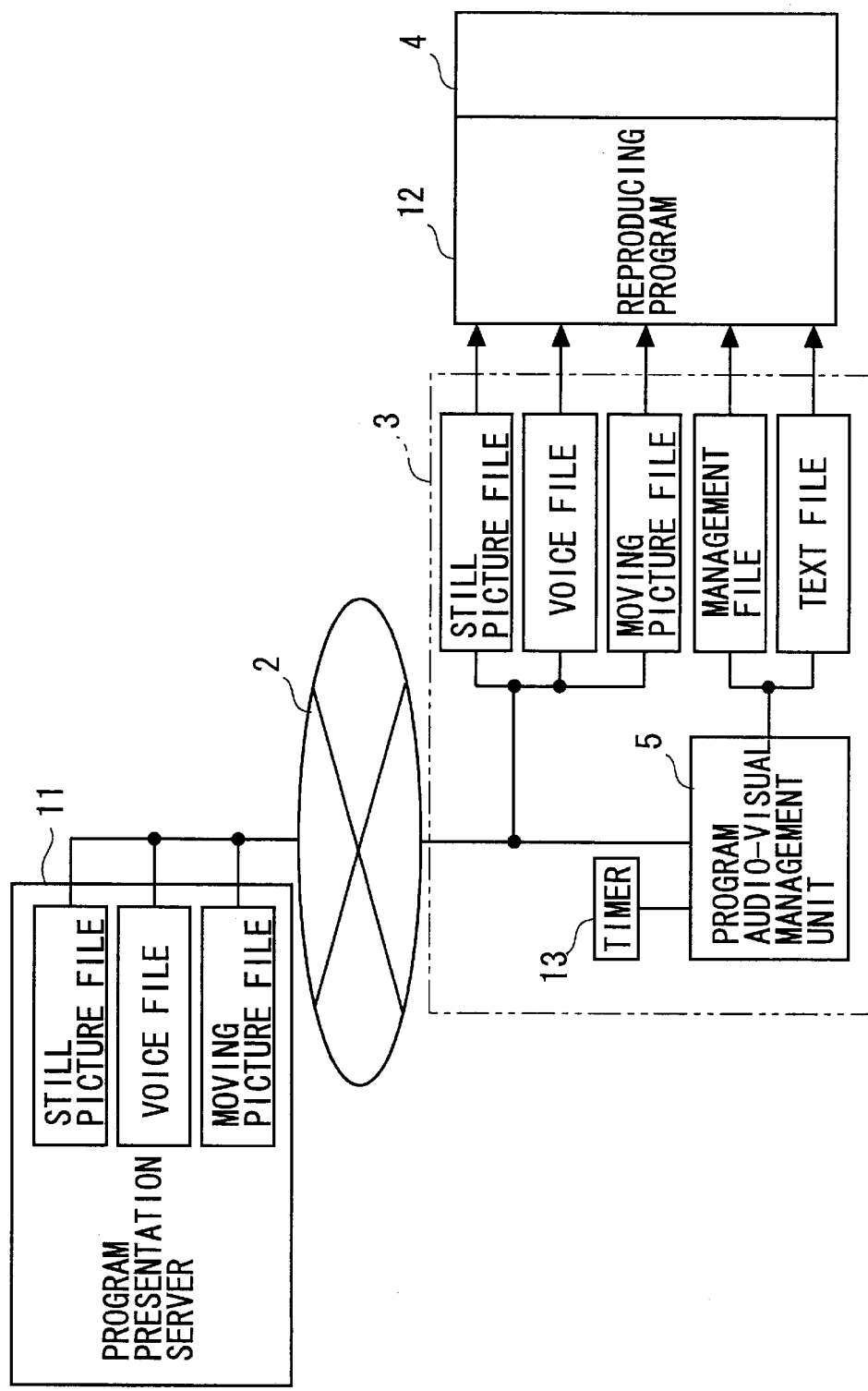
FIG. 8 is a block diagram showing a configuration of a system of a second embodiment according to the present invention.
Figure 9:
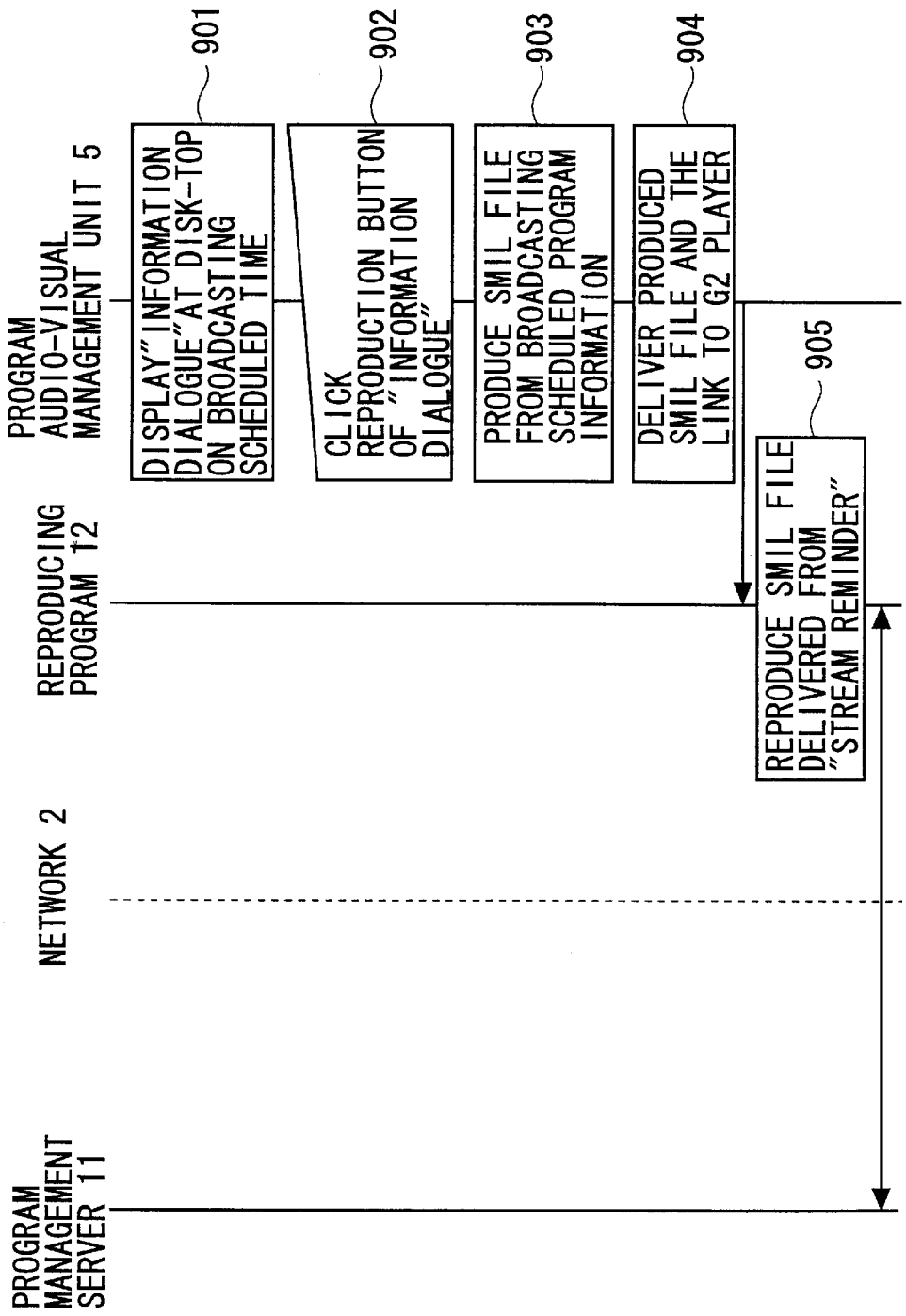
FIG. 9 is a sequence diagram showing the processing procedure with a program presentation server in the second embodiment.

FIG. 8 is a block diagram showing a configuration of a system for urging a user to view the program which has been described in the first embodiment.

In a second embodiment, for the information of the still pictures, the voice and the moving pictures which is presented through the network 2 either from the program presentation server 11 or from the advertisement presentation server 101, the management file which is used to manage integrally the text file and those is produced on the user terminal side to be reproduced using the reproducing program 12 on the browser 4, thereby reducing the burden exerted on the user side.

Figure 11:
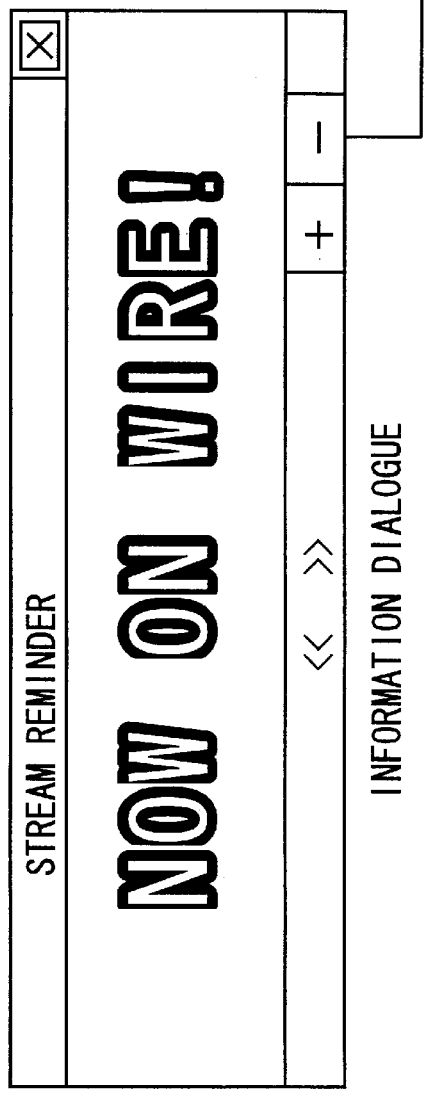
FIG. 11 is a diagram showing a dialogue displayed on a program audio-visual terminal.

First of all, the program audio-visual management unit 5 compares the time information from a timer 13 with the date and time information of the program information which is possessed by the unit 5 and then when it becomes the time of several hours before the viewing scheduled time, read out the dialogue as shown in FIG. 11 from its storage means to display it on the browser 4 (Step 901).

At the time when the dialogue as shown in FIG. 11 is specified by the coordinate specifying means such as a mouse (Step 902), the program audio-visual management unit 5 delivers the still picture file which has been received either from the program presentation server 11 or from the advertisement presentation server 101, a text file 9 which is stored in its storage unit 102, and a management file which has been produced by the unit 5 to the reproducing program 12 (Step 904).

That management file is, for example, produced on the basis of the program information which is previously received from the program presentation server 11, which was described in the first embodiment, by the program audio-visual management unit 5 (Step 903).

That management file contains the management information relating to which location on the picture at what time at least the still picture file and the text file are reproduced.

Figure 12:
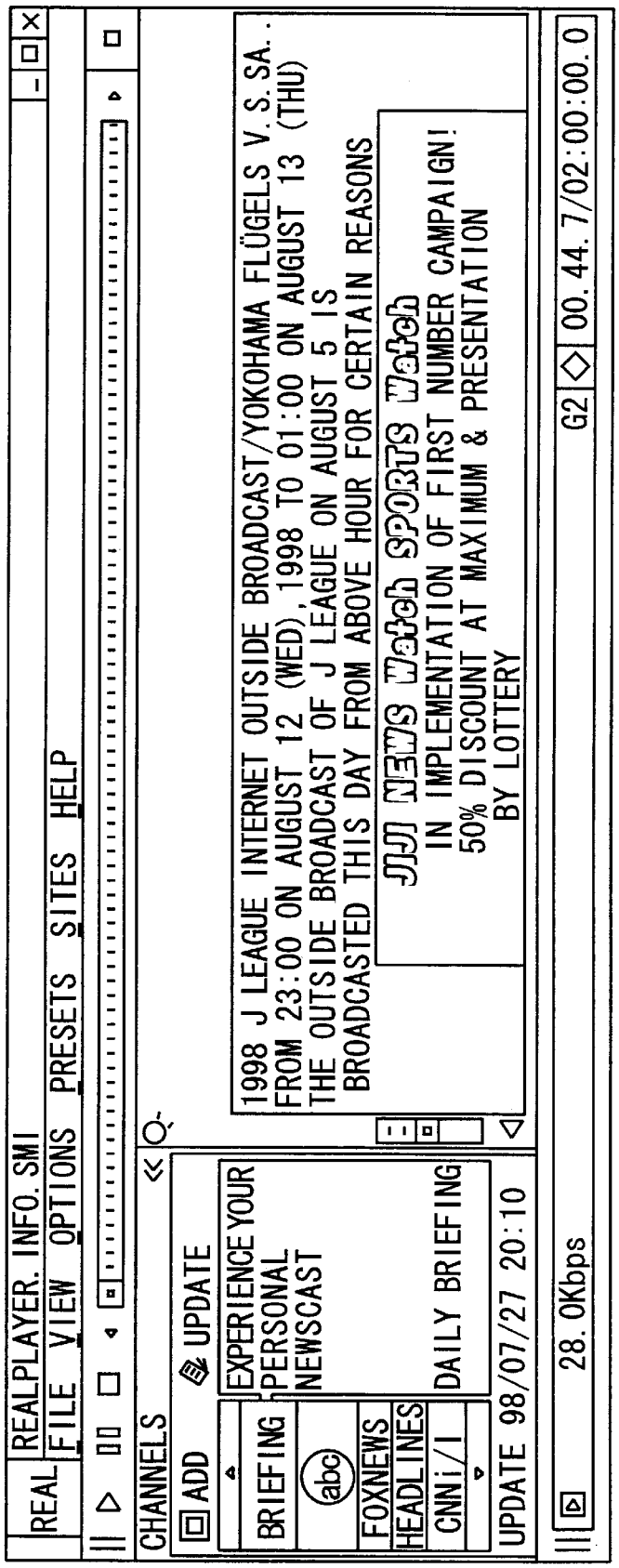
FIG. 12 is a diagram showing an example (2) displayed on a program audio-visual terminal in the second embodiment.

The reproducing program 12 reproduces both of the text file and the still picture file on the basis of that information of the management file (Step 905). FIGS. 10 and 12 show an example of the reproduction result.

As described above, in the second embodiment, the still picture file which has been presented by the program presentation server 11, and the text file which has been produced on the user terminal side are synchronously reproduced on a screen by the management file, whereby the reduction of the transferred data from the server and the reduction of the labor on the program production side can be realized as compared with the case where all of the files are collectively presented on the server side, and also it is possible to present the information having the high advertisement effect to any of users.

Third Embodiment

The present embodiment is the embodiment relating to the type of advertisement contents which will be presented before the presentation of the program contents.

In viewing the program with the program audio-visual terminal 1), the URL of the program presentation server 11 is specified from the program audio-visual terminal 10, whereby the program contents which are stored in the program presentation server 11 of interest are downloaded to the program audio-visual terminal 10. At this time, the program audio-visual management unit 5 reads out the banner ID from the program information setting file 6. This banner ID is used to specify the URL of the advertisement contents which are stored in the advertisement presentation server 101 and hence the advertisement contents are uniquely determined for every program.

FIG. 10 shows an example of the concrete display on the browser 4 of the advertisement contents. Then, as described in the first embodiment, such procedure may be adopted that the still picture file of the advertisement contents is downloaded from the advertisement presentation server 101 and also the text-file 9 is read out from its storage unit 102.

While in the above description, the advertisement contents have been described in such a way as to be uniquely determined as the banner ID from the program information, when presenting the advertisement contents, a contents table 1301 shown in FIG. 13 may also be employed. This contents table 1301 is set either in the storage unit 102 of the program audio-visual terminal 10 or in the advertisement presentation server 101. In the contents table 1301, the correspondence among the user addresses on the basis of which the program contents are viewed by the program audio-visual terminal 10, the categories of the program contents and the URLs of the advertisement contents corresponding to the categories is established.

In this connection, for the categories of the program contents, when the program information 1b of the program presentation server 1a is downloaded, the information relating to the categories of the program contents of interest is copied in %he program information setting file 6 as it is, thereby being able to acquire the categories of the program contents of interest.

The contents table 1301 is designed in such a way that the optimal advertisement contents can be presented to a user as a viewer on the basis of the category of the program contents. That is, if it is assumed that the program contents for which a user carries out the program viewing reservation are "Outside Broadcast of Baseball", "Sport" is set as its category and hence the URL of the advertisement contents relating to the sport is determined.

In such a way, a user can view the advertisement contents which are suitable for the category of the program either before the distributive transmission of the reserved program contents or synchronously with the distributive transmission of the program contents.

In addition, the program presenter side resets that contents table 1301, thereby being able to present the advertisement contents for P.R. of the enterprise such as a sponsor when viewing the program.

Fourth Embodiment

The present embodiment is the embodiment wherein when carrying out the program reservation viewing in the first embodiment, the function of the reservation recording/picture recording of the program of interest is added thereto.

The fourth embodiment is such that in the program audio-visual management unit 5, when reserving the program to the program information setting file 6, the reservation of the recording and the picture recording of the program contents as well as the audio-visual reservation can be carried out.

In order to realize that function, the storage destination file on the basis of which the storage destination file can be specified when producing the program information setting file 6 is set in the storage unit 102.

In addition, the program audio-visual management unit 5 has a recording/picture recording unit 1401. The recording/picture recording unit 1401 has a function of storing, as one of the programs of the program audio-visual management unit 5, the program contents data in the form of the voice data file or the moving picture data file in the storage unit 102.

Figure 14:
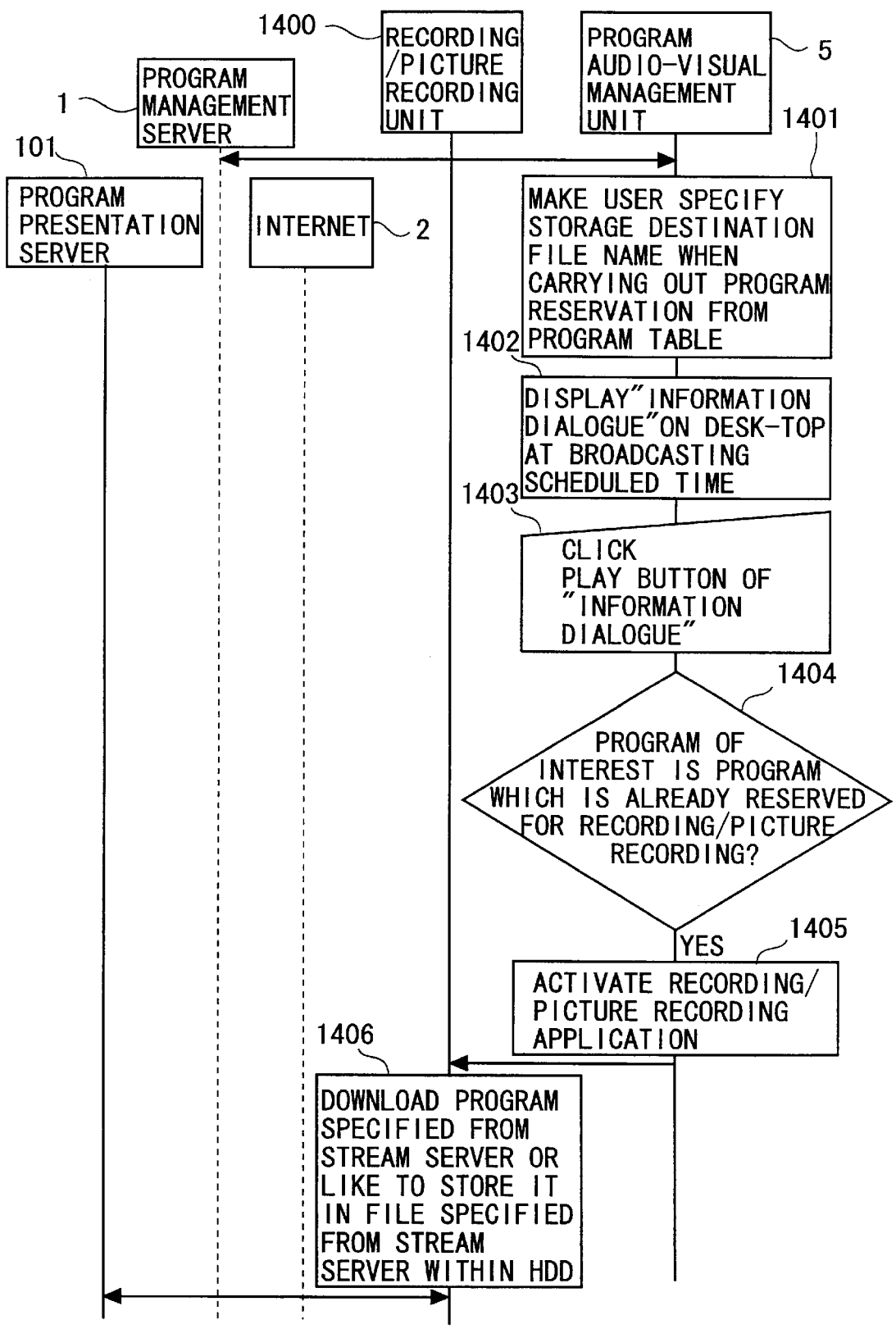
FIG. 14 is a sequence diagram showing the procedure of the reserved recording/picture recording of a program in a fourth embodiment according to the present invention.

Next, the processing procedure of the present embodiment will hereinbelow be described with reference to FIG. 14.

First of all, when the program audio-visual management unit 5 carries out the program reservation on the basis of the program information of the program management server 1, a user is made to specify the storage destination file name (Step 1401). While the file is set in the storage unit 102, if there is no specification of the file, then the program audio-visual management unit 5 may automatically produce the file as a default value from the data of the reserved date and time.

Next, at the time when it becomes the scheduled time to broadcast the program, the dialogue as shown in FIG. 11 is displayed on the browser 4 (Step 1402). Then, if a user specifies the reproducing button (Play) shown in FIG. 11 (Step 1404), then the reproducing program in the normal program audio-visual program is activated and also the recording/picture recording program (the recording/picture recording unit 1401) is activated (Step 1405).

In response to the activation instruction issued from the program audio-visual management unit 5, the recording/picture recording unit 1401 stores the reproducing data (the voice data or the moving picture data) in the file name which is defined in the program information setting file 6 in the storage unit 102 (Step 1406).

In such a way, the program contents for which the reservation of the recording/picture recording is carried out are accumulated in the storage unit 102.

In this connection, while in Step 1403, the example has been described in which a user issues the reproduction instruction to activate the recording/picture recording function, at the time when it becomes the time to start the program, the program audio-visual management unit 5 may immediately activate the recording/picture recording unit 1401 without requiring any of the manipulations on the user side.

In addition, the program reservation is not effective for all of the programs. That is, for the program such as the outside broadcast of a sport or a concert, it is also possible not to permit the recording/picture recording on the basis of the intention on the contents presenter side.

For example, when carrying out the registration to the program information setting file in the reservation, the program audio-visual management unit 5 may make inquire to the program management server 1 in order to check whether or not the program of interest is the program for which the reservation of the recording/picture recording is permitted.

While the present invention has been particularly shown and described with reference to the preferred embodiments and the specified modifications thereof, it will be understood that the various changes and other modifications will occur to those skilled in the art without departing from the scope and true spirit of the invention. The scope of the invention is therefore to be determined solely by the appended claims.

What is claimed is:

1. In a method of distributively transmitting at least program information comprising a distributive transmission date and time, and program contents which will be transmitted on the distributive transmission date and time through a network, a method of receiving time-specified program contents comprising the steps of:

receiving the program information from a program management server in which the distributive transmission date and time, and an address of a distributive transmission server are registered;

registering the program information obtained from the program management server through the network, and registering an acquisition date and time that the program information was obtained from the program management server;

comparing the distributive transmission date and time on subsequent acquisition dates and times with the distributive transmission date and time on prior acquisition dates and times upon every access to the program management server; and rewriting the distributive transmission date and time to reflect any changes in the distributive transmission date and time registered in the program management server from prior acquisition dates and times.

2. A method according to claim 1, wherein the general purpose schedule data on the basis of which a date and time are specified is produced from the distributive transmission date and time of the program information, and the information relating to the audio-visual reservation of the program contents is displayed on a general purpose scheduler of the audio-visual terminal unit.

3. A method according to claim 1, wherein charging information is recorded whenever the program information is registered.

4. In a method of distributively transmitting at least program information comprising a distributive transmission date and time, and program contents which will be transmitted on the distributive transmission date and time through a network, a method of receiving time-specified program contents, comprising the steps of:

receiving the program information from a program management server in which the distributive transmission date and time, and an address of a distributive transmission server are registered;

registering the program information obtained from the program management server through the network;

comparing the distributive transmission date and time on subsequent acquisition dates and times with the distributive transmission date and time on prior acquisition dates and times upon every access to said program management server to detect whether the distributive transmission date and time have updated in said program management server;

rewriting the distributive transmission date and time to reflect any changes in the distributive transmission date and time registered in the program management server from prior acquisition dates and times;

accessing a program contents server on the registered distributive transmission date and time to receive and reproduce the program contents for reproduction thereof; and receiving advertisement contents from an advertisement presentation server prior to or synchronously with receiving the program contents to reproduce the advertisement contents.

5. A method according to claim 4, wherein the advertisement contents correspond to the program contents or categories of the program contents, and the advertisement contents are determined on the basis of the reservation histories of past program contents of a user.

6. A method according to claim 4, wherein the advertisement contents are determined on the basis of personal information accumulated in an audio-visual terminal unit or an advertisement presentation server.

7. In a system for distributively transmitting at least program information comprising a distributive transmission date and time, and program contents which will be transmitted on the distributive transmission date and time through a network, a system for presenting time-specified program information, comprising:

a program management server having program information in which at least the distributive date and time and an address of a distributive transmission server are registered;

a program contents presentation server for distributively transmitting the program contents;

program information setting management means for registering therein the program information obtained from the program management server through the network, said program information setting management means comprising means for comparing the distributive transmission date and time on subsequent acquisition dates and times with the distributive transmission date and time on prior acquisition dates and times upon every access to said program management server to detect whether the distributive transmission date and time have updated in said program management server, and means for rewriting the distributive transmission date and time to reflect any changes in the distributive transmission date and time registered in the program management server from prior acquisition dates and times; and means for accessing the program contents presentation server on the distributive transmission date and time the information of which has been obtained from the program information to acquire the program contents to reproduce the program contents thus acquired.

8. A system according to claim 7, wherein said program information setting management means further comprises:

means for recording an acquisition date and time that program information was acquired by accessing said program management server, and the distributive transmission date and time of the program information obtained from the program management server.

9. A system according to claim 7, wherein said program information setting management means further comprises program table producing means for producing a program table in a table form on a program audio-visual terminal side on the basis of the program information.

10. A storage medium storing therein a program which receives at least program information containing a distributive transmission date and time, and program contents which will be transmitted on the distributive transmission date and time through a network, said program comprising the steps of:

receiving the program information from a program management server in which the distributive transmission date and time, and an address of a distributive transmission server are registered;

registering the program information obtained from said program management server through said network;

comparing the distributive transmission date and time on subsequent acquisition dates and times with the distributive transmission date and time on prior acquisition dates and times upon every access to said program management server to detect whether the distributive transmission date and time have updated in said program management server;

rewriting the distributive transmission date and time to reflect any changes in the distributive transmission date and time registered in the program management server from prior acquisition dates and times;

accessing a program contents presentation server on the distributive transmission date and time; and reproducing the program contents obtained from said program contents presentation server.

* * * * *